United States Patent [19]
Kern et al.
[11] Patent Number: 5,064,271
[45] Date of Patent: Nov. 12, 1991

[54] FIBER OPTIC FLAME AND OVERHEAT SENSING SYSTEM WITH SELF TEST

[75] Inventors: Mark T. Kern; John M. Wetzork, both of Goleta; Kenneth A. Shamordola, Santa Barbara; Gregory L. Tangonan, Oxnard, all of Calif.

[73] Assignee: Santa Barbara Research Center, Goleta, Calif.

[21] Appl. No.: 322,866

[22] Filed: Mar. 14, 1989

[51] Int. Cl.[5] .......... G02B 6/02; G02B 6/16

[52] U.S. Cl. .......... 385/33; 340/578; 385/123

[58] Field of Search .......... 350/96.29; 340/578

[56] References Cited

U.S. PATENT DOCUMENTS

| | | | |
|---|---|---|---|
| 2,901,740 | 8/1959 | Cutsogeorge | 340/233 |
| 3,406,389 | 10/1968 | Nailen | 340/411 |
| 3,540,041 | 11/1970 | Payne | 340/409 |
| 3,546,689 | 12/1970 | Lindberg | 340/227 |
| 3,730,259 | 5/1973 | Wixson et al. | 165/5 |
| 3,826,992 | 7/1974 | Friedl | 372/6 |
| 3,880,234 | 4/1975 | Showalter et al. | 166/251 |
| 3,977,900 | 8/1976 | Luehrs | 136/83 |
| 4,138,655 | 2/1979 | Nakano et al. | 338/30 |
| 4,400,680 | 8/1983 | Heline, Jr. | 337/415 |
| 4,496,930 | 1/1985 | Krecisz et al. | 338/26 |
| 4,623,788 | 11/1986 | Kern et al. | 250/227 |
| 4,639,598 | 1/1987 | Kern et al. | 250/339 |
| 4,647,776 | 3/1987 | Kern et al. | 250/339 |
| 4,650,003 | 3/1987 | Euson | 169/60 |
| 4,655,607 | 4/1987 | Kern et al. | 250/227 |
| 4,665,390 | 5/1987 | Kern et al. | 340/587 |
| 4,679,156 | 7/1987 | Kern et al. | 364/551 |
| 4,691,196 | 9/1987 | Kern et al. | 340/578 |
| 4,701,624 | 10/1987 | Kern et al. | 250/554 |
| 4,752,115 | 6/1988 | Murray et al. | 350/96.34 |
| 4,769,775 | 9/1988 | Kern et al. | 364/551.01 |
| 4,785,292 | 11/1988 | Kern et al. | 340/578 |

OTHER PUBLICATIONS

"Fluorescent Decay Thermometer with Biological Applications", by R. R. Sholes et al., Rev. Sci. Instrum., vol. 41, No. 7, Jul. 1980.

"A Laser-Pumped Temperature Sensor Using the Fluorescent Decay Time of Alexandrite", by A. T. Augousti et al., Journal of Lightwave Technology, vol. LT-5, No. 6, Jun. 1987.

"Temperature Sensing by Thermally-Induced Absorption in a Neodymium Doped Optical Fiber", by M. Farries et al., SPIE, vol. 798, Fiber Optic Sensors II (Jan. 1987).

"Fiber Sensor Devices & Applications", by A. D. Kersey published for the Conference on Optical Fiber Communication, Jan. 1989.

*Primary Examiner*—William L. Sikes
*Assistant Examiner*—Robert E. Wise
*Attorney, Agent, or Firm*—W. C. Schubert; W. K. Denson-Low

[57] ABSTRACT

A fiber optic fire and overheat sensor system 10 includes a fiber optic cable 12 having a lens 14 at a distal to direct radiation from a fire 16 into the cable 12 and to a radiation detector 18 disposed at a proximal end of the cable 12. Detector 18 is coupled to a fire sensor 19. The detector 18 is sensitive to two wavelength bands including a short wavelength band of approximately 0.8 to approximately 1.1 microns and a long-wavelength band of approximately 1.8 to approximately 2.1 microns. A controller 21, such as a microprocessor, analyzes the fire sensor 19 output signals which correspond to the two spectral bands to determine if a fire is present. The system 10 further includes a body of fluorescent material 20 disposed at the distal end of the cable 12. The material 20 can be interposed between a reflecting surface, such as a mirror 22, and a lens, such as a collimating lens 24. A fiber optic coupler 26 and 26*a* launches radiation from a source 28, such as a laser diode, into the fiber optic cable 12. The fluorescent material is pumped by the source 28 at a first wavelength, the rate of decay of a resulting fluorescent emission being measured and correlated with predetermined decay rates to derive the temperature of the material 20 and, hence, the ambient temperature of a region within which the material 20 is disposed.

10 Claims, 3 Drawing Sheets

FIBER OPTIC FLAME AND OVERHEAT SENSING SYSTEM WITH SELF TEST

FIELD OF THE INVENTION

This invention relates generally to fire detection systems and, in particular, to a fiber optic fire detection system which also detects an overheat condition by employing a temperature dependent fluorescence characteristic of a crystal disposed at a distal end of the fiber.

BACKGROUND OF THE INVENTION

One conventional fire and overheat sensor is known as a "thermal wire". This system senses a fire or overheat condition by thermal conduction from ambient to the center of a 1/16 inch diameter stainless steel tube. The sensing element may be a hydride which generates a gas as the temperature increases, the generated gas being sensed by a pressure switch. Alternatively the sensing element may be a salt which melts as temperature increases thus causing a change in an electrical resistivity vs. temperature characteristic of the sensing element.

Another conventional fire and overheat sensor employs a far-infrared optical detector to detect radiometric heat in combination with a two spectrum, far-near infrared fire detector.

However, for many high ambient temperature applications, such as jet aircraft engine nacelles, this latter type of system may not be usable in that the system typically has a maximum ambient temperature limitation of approximately 400° F. This maximum ambient temperature limitation is due in large part to the maximum temperature limits of the sensor electronics.

The thermal wire type of system, which typically has a higher ambient temperature limitation, is suitable for use in an engine nacelle. However, this type of system has a relatively slow response time. This type of system furthermore may not detect as many as 40% of confirmed fires while exhibiting up to a 60% false alarm rate.

In U.S. Pat. Nos. 4,701,624, 4,691,196, 4,665,390 and 4,639,598, all of which are assigned to the assignee of this invention, there are described fire sensor systems which have overcome the problems inherent in the aforementioned thermal wire type of system. These systems accurately and rapidly detect the occurrence of a fire while also eliminating false alarms. However, in that these systems employ wavelengths of less than two microns they generally cannot also simultaneously be employed for detecting overheat conditions in a radiometric fashion as described in U.S. Pat. No. 4,647,776, which is assigned to the assignee of this patent application.

It is thus an object of the invention to provide both a flame and heat sensing system which employs wavelengths of less than two microns for flame detection while simultaneously detecting an overheat condition.

It is a further object of the invention to provide a flame and heat sensing system which employs wavelengths of less than two microns for flame detection while simultaneously detecting an overheat condition such that an actual flame condition is not required to generate an alarm condition.

It is also an object of the invention to provide a capability to upgrade a fiber optic fire sensor system with a capability to detect an overheat condition.

It is one further object of the invention to provide a flame and an overheat detection system for use in an environment having a high ambient temperature, such as an aircraft engine nacelle, and which further eliminates the undetected fire and false alarm deficiencies of conventional systems, such as thermal wire systems.

It is a further object of the invention to provide a fiber optic flame detection system with an overheat condition detection capability by employing a temperature dependent fluorescence characteristic of a material which is disposed at a far end of the fiber, the material being pulsed with optical radiation at a first wavelength and a fluorescent response of the material being determined at a second wavelength.

It is a further object of the invention to provide an overheat detection capability with a minimum of additional components at the distal end of a fiber and with few or no additional components in the fire sensor electronics, beyond those components that would be required for a built in test of the fiber and electronics.

It is also an object of the invention to provide signal processing circuitry such that a fire sensing function and an overheat sensing function do not interfere with one another even though these two functions may share the same fiber, detectors and circuitry.

SUMMARY OF THE INVENTION

The foregoing problems are overcome and other advantages are realized by a fiber optic fire and overheat sensor system that includes a fiber optic cable having a lens at a distal end to direct radiation from a fire into the cable and to a radiation detector disposed at a proximal end of the cable. The detector is coupled to a fire sensor. The detector is sensitive to two wavelength bands including, by example, a short wavelength band of approximately 0.8 to approximately 1.1 microns and a long-wavelength band of approximately 1.8 to approximately 2.1 microns. A controller, such as a microprocessor, analyzes the fire sensor output signals which correspond to the two spectral bands to determine if a fire is present. The system further includes a body of fluorescent material disposed at the distal end of the cable. In a preferred embodiment the material is interposed between a reflecting surface, such as a mirror, and a lens, such as a collimating lens. A fiber optic coupler launches a radiation a source, such as a laser diode, into the fiber optic cable. This source of radiation is periodically modulated and may be, by example, pulsed or sinusoidal. The fiber optic cable both transmits the source radiation to the distal end and also returns the fluorescence and fire signal from the distal end to the detector. The fluorescent material is pumped by the source at a first wavelength, the rate of decay of a resulting fluorescent emission being measured and correlated with predetermined decay rates to derive the temperature of the material and, hence, the ambient temperature of a region within which the material is disposed.

In accordance with one aspect of the invention there is disclosed a fire detection system having a fiber optic conductor for conveying radiation at least from a distal end to a proximal end thereof. The system includes first means, optically coupled to the proximal end of the fiber optic conductor, for detecting within a first and a second spectral band the radiation conveyed from the distal end of the fiber optic conductor. The system also includes second means, optically coupled to the distal end of the fiber optic conductor, for emitting radiation within at least the second spectral band, the emitted radiation having at least one characteristic which is a function of a temperature of the second means. The system further includes third means, optically coupled to the second means through the fiber optic conductor, for generating radiation for inducing the second means to emit the radiation within the second spectral band.

In accordance with a method of the invention there is disclosed for use in a fire detection system having a fiber optic conductor for conveying radiation having wavelengths within a first and a second spectral band from a distal end to a proximal end thereof, the radiation originating from within a region of interest, a method of sensing an overheat condition within the region of interest. The method includes the steps of (a) generating radiation at a wavelength for inducing a selected material to emit fluorescent radiation; (b) conveying the radiation through the fiber optic conductor to a body of selected material which is in thermal communication with the region of interest, (c) inducing the body of fluorescent material to emit fluorescent radiation having wavelengths within the second spectral band, a decay time constant of the emitted fluorescent radiation having a magnitude which is a function of a temperature of the body of fluorescent material, (d) sampling the emitted fluorescent radiation to determine the decay time constant thereof, and (e) correlating the determined decay time constant with the temperature of the body of fluorescent material.

BRIEF DESCRIPTION OF THE DRAWING

The above set forth and other features of the invention will be made more apparent in the ensuing Detailed Description of the Invention when read in conjunction with the attached Drawing, wherein.

DETAILED DESCRIPTION OF THE INVENTION

Figure 1:
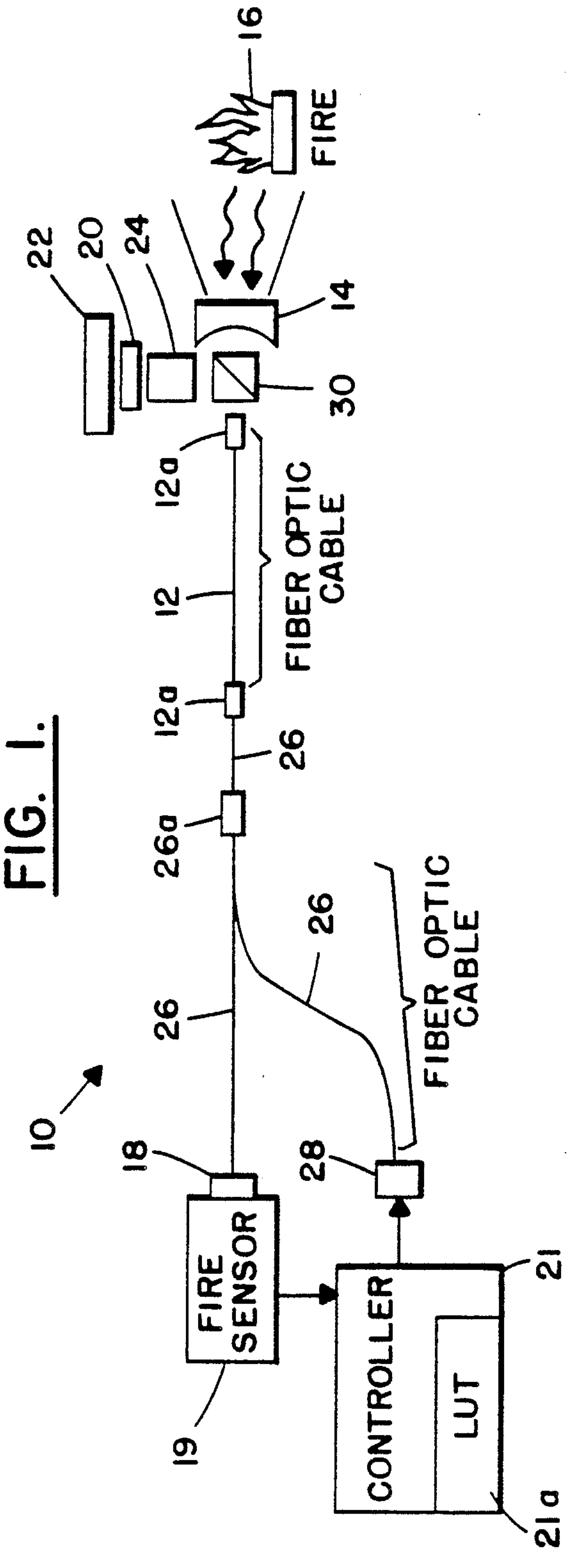
FIG. 1 is a block diagram which illustrates the various optical and electrical components which comprise a fire and overheat sensor which is one embodiment of the invention.

Referring to FIG. 1 there is shown a fiber optic fire and overheat sensor system 10. System 10 includes a fiber optic cable 12 having a lens 14 at a distal end to direct radiation from a fire 16 into the cable 12 through an optical coupler 12*a* and to a radiation detector 18 disposed at a proximal end of the cable 12 where an optical coupler 26, 26*a* is of minimal length and serves to introduce a controlled source 28 of radiation into the fiber 12. Detector 18 is coupled to a fire sensor 19. The detector 18 is typically comprised of silicon disposed on lead sulfide and is sensitive to two wavelength bands. In a presently preferred embodiment of the invention the two bands include a short wavelength band of approximately 0.8 to approximately 1.1 microns and a long-wavelength band of approximately 1.8 to approximately 2.1 microns. A controller 21, such as a microprocessor, analyzes the fire sensor 19 output signals which correspond to the two spectral bands to determine if a fire is present. As can be appreciated the use of a small diameter fiber optic cable with a correspondingly dimensioned pickup 14 lens enables the system 10 to detect fires in small and relatively inaccessible locations.

In addition, the fire sensor 19 together with the controller 21 is small and compact (palm of hand size) and a single fire sensor/controller module 19, 21 can be used with a multiplicity of fiber optic cables 12 and fiber optic couplers 26. One convenient packing function includes seven fiber optic cables 12 interfacing with a single fire sensor/controller 19, 21.

Figure 1A:
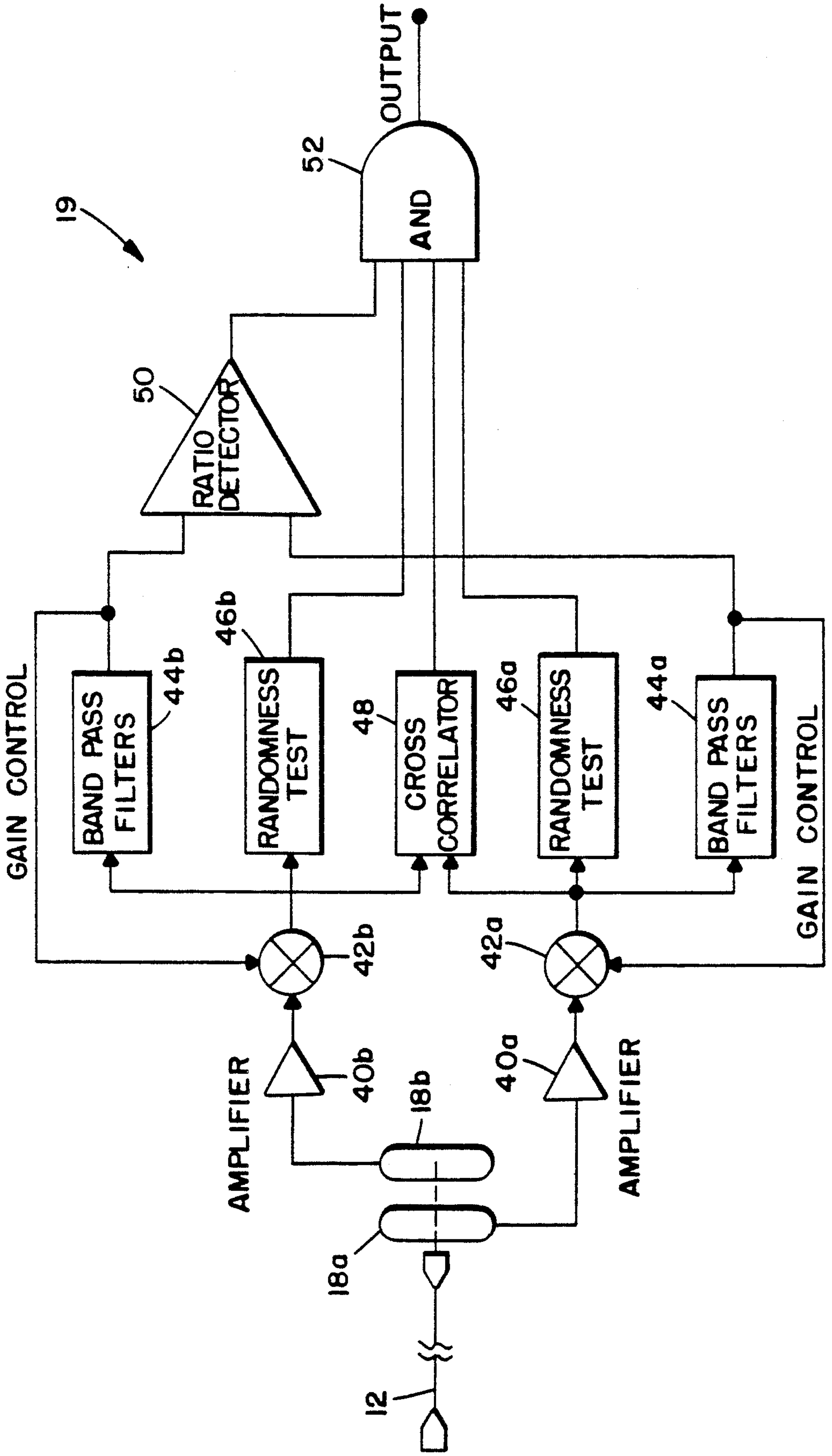
FIG. 1*a* is a block diagram which shows in greater detail the sensor of FIG. 1.

Referring to FIG. 1*a* there is shown in greater detail the sensor 19 of FIG. 1. The high sensitivity fiber optic fire sensor 19 employs spectral discrimination, flicker frequency discrimination, automatic gain control (AGC), ratio detection, cross correlation and randomness tests to achieve a wide dynamic range of detectable input stimuli without compromising false alarm immunity. It should be realized that the various blocks shown in FIG. 1*a* may be constructed from discrete circuitry or the functionality of the various blocks may be realized by instructions executed by a microcontroller device such as a digital signal processor (DSP).

Radiation is detected in the two aforementioned infrared spectral bands; namely the long wavelength and the short wavelength spectral bands. The specific bands, approximately 0.8 to approximately 1.1 microns and approximately 1.8 to approximately 2.1 microns, are selected to enhance false alarm immunity. The radiation is collected at the distal end of the fiber optic cable 12 and is conducted thereby to the dual concentric, multi-layer detector 18 which comprises two infrared-sensitive elements (18*a*, 18*b*) contained within a unitary sealed package. Each of the detectors 18*a* and 18*b* has an output coupled to a corresponding low noise amplifier 40*a* and 40*b*. The output of each of the amplifiers 40 are applied to an associated variable gain block 42*a* and 42*b* where, in conjunction with a corresponding bandpass filters 44*a* and 44*b*, an AGC function is accomplished. Filters 44*a* and 44*b* are comprised of a multiplicity of bandpass filters such as 1 Hz, 2 Hz and 4 Hz where an output of each bandpass filter is required in order to guarantee that the detected fire has a broad spectral frequency distribution and is not dominated by a single frequency such as a modulated artificial source. The output of each of the variable gain elements 42*a* and 42*b* are input to a corresponding randomness test block 46*a* and 46*b* and to a cross-correlator 48. A ratio detector 50 accomplishes a ratiometric comparison of the outputs of bandpass filters 44*a* and 44*b*. An AND logic function generator 52 receives as inputs the outputs of the ratio detector 50, randomness test blocks 46*a* and 46*b* and the cross-correlator 48. A generator 52 output signal is asserted true, indicating the occurrence of a fire, when each of the inputs are true.

It has been determined that most false alarm sources have a spectral frequency distribution significantly different from that of flames when observed in two separated wavelength regions. The modulation component of the signals from the two wavelength regions is filtered by filters 44a and 44b into selected frequencies within the flicker frequency spectrum. This filtering provides additional discrimination against false alarms, most of which have intensity fluctuation spectra different from those of the flames of interest. To preserve this discrimination while allowing a wide range of intensity levels, the flicker modulation spectral information is detected by a ratiometric method (detector 50) which is independent of the absolute value of the spectral information. Additional variation in signal levels is made possible by the variable gain stages 42a and 42b which precede signal processing.

The flame flicker statistics, such as amplitude and spectral distributions, can be shown to be highly variable in that the spectrum as observed over any time interval of several seconds may be quite different from the spectrum taken over a subsequent time interval. However, and as is shown in U.S. Pat. No. 4,665,390, assigned to the assignee of the patent application, when the fire is modeled as a random process and a randomness test such as Chi Square or Kurtosis is applied, flame flicker is easily separated from non-flame modulated sources. In some cases a relatively simple amplitude modulation test is sufficient approximate these randomness tests.

A further processing step is used in comparing the shapes of the unfiltered long and short wavelength signals with the cross-correlation block 48. To eliminate false alarms due to chopped, periodic, signals the randomness test blocks 46a and 46b are also employed within each of the short and long wavelength signal channels.

A fire sensor 19 response delay of approximately one second is preferably incorporated to eliminate the possibility of false alarms due to brief signal transients not caused by flame flicker.

Returning to FIG. 1 and in accordance with a presently preferred embodiment of the invention the system 10 further comprises a body of fluorescent material 20 disposed at the distal end of the cable 12. In the preferred embodiment the material 20 is interposed between a reflecting surface, such as a mirror 22, and a lens, such as a collimating lens 24.

As used herein, fluorescence is considered to be an emission from a material, such as a doped crystalline material, of a first wavelength of radiation when excited or pumped by a light source having a second wavelength of radiation. Many types of crystals exhibit fluorescence including ruby (chromium doped sapphire) and neodymium doped glass. One useful property of fluorescence is that the rate at which the emission decays is often a function of the temperature of the material. In accordance with one aspect of the invention the fluorescent material 20 of the fire sensor system 10 is pumped by a source 28 at a first wavelength to generate fluorescence at a second wavelength. The rate of decay of the resulting fluorescent emission is measured and correlated with predetermined decay rates to derive the temperature of the material 20 and, hence, the ambient temperature of a region within which the material 20 is disposed.

Figure 2A:
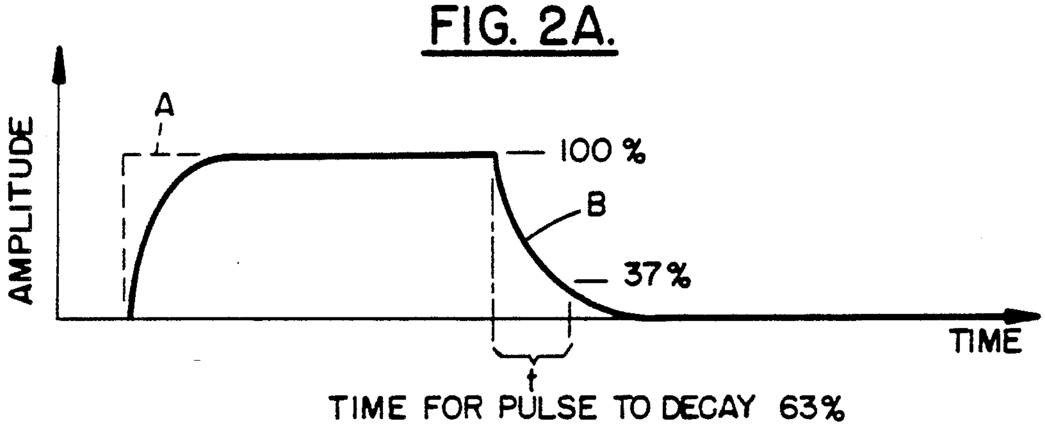
FIG. 2*a* is a graph which illustrates a pulse response of a fluorescent crystal, including the temperature-dependent time for fluorescent decay from 100% to 37%.
Figure 3:
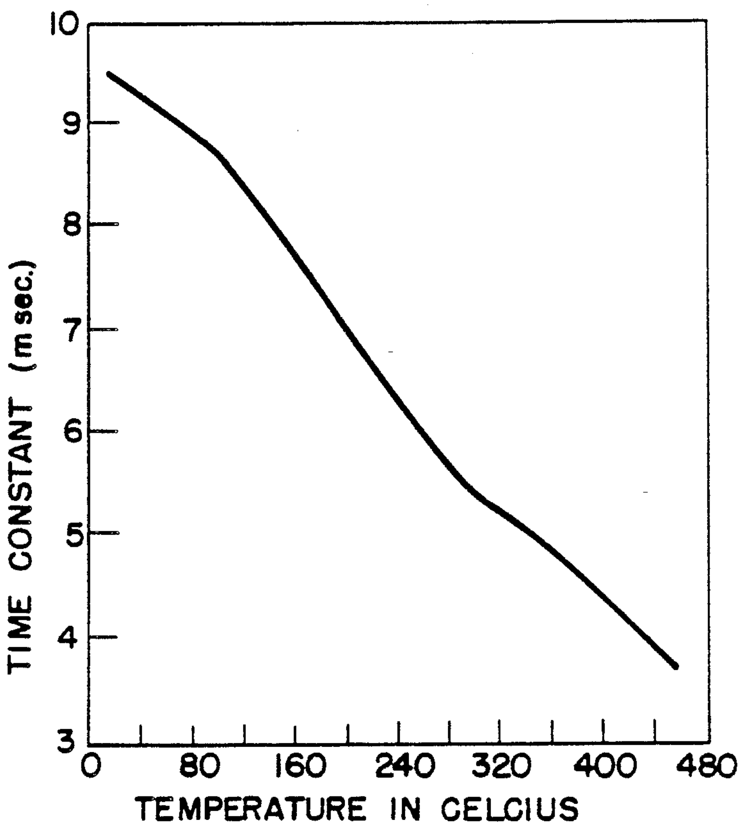
FIG. 3 is a graph which illustrates the fluorescent time constant as a function of temperature of one type of fluorescent material which is suitable for use with the system of the invention.

As an example, and referring to FIG. 2a, the source 28 may be pulsed (dotted pulse A) at the first wavelength to excite the fluorescent material at the second wavelength as shown by the output pulse (solid pulse B) having a slower rise and fall time. The time required for the fluorescence to decay is a function of temperature and, typically, this time constant decreases in duration as temperature increases. The time constant (t) required for the emission to decay to 37% of its initial value can be plotted, in a manner shown in FIG. 3, as a function of temperature. FIG. 3 shows a plot of the fluorescent decay time constant vs. temperature for a thulium and holmium doped yttrium-aluminum garnet (Tm:Ho:YAG) crystal.

Figure 2B:
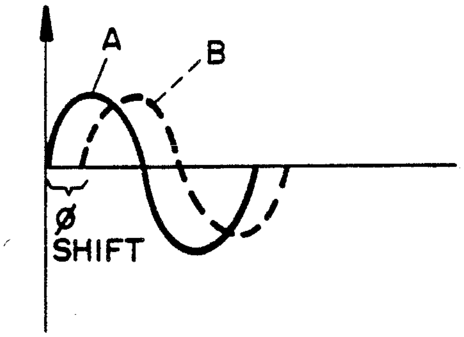
FIG. 2*b* is a graph which illustrates a sinusoidal response of a fluorescent crystal.

FIG. 2b shows an embodiment wherein the source 28 is energized to produce a sinusoidal excitation (A) of the fluorescent material 20. The fluorescent emission (B) is also sinusoidal but is phase shifted by an amount which is a function of temperature.

Referring once more to FIG. 1 the foregoing teaching is incorporated within the system 10 by the use of the fiber optic coupler 26 and 26a which launches radiation from the source 28, such as a laser diode, into the fiber optic cable 12. The fiber optic cable 12 thus both transmits the source radiation to the distal end and also returns the fluorescence and fire signal from the distal end to the detector 18. Also disposed at the distal end of the cable 12 is a beamsplitter, such as two millimeter square beamsplitter 30, which directs the radiation from the source 28 to the crystal 20. In a preferred embodiment of the invention the source 28 emits radiation within the lower spectral band, such as 0.8 microns, so that the source pulse can be detected by detector 18 to provide a reference signal. However, in other embodiments of the invention the laser diode does not emit within the lower spectral band. By example, the source 28 emission may be at 0.6 microns such that no source 28 generated radiation returns to or is detected by the detector in the 0.8 to 1.1 micron band.

In operation radiation from a fire enters the lens 14 and passes via the beamsplitter 30 and cable 12, to the detector 18 A pulse of radiation from the 0.8 micron source 28 passes from the coupler 26 and 26a to the fiber cable 12. Half of the pulse energy is deflected by the beamsplitter 30 through the lens 24 and the fluorescent material 20. The material 20 is pumped by the pulse and is caused to fluoresce. Some of the fluorescent emission reflects off of the mirror 22 and passes back through the material 20, lens 24 and beamsplitter 30 into the fiber 12 and to the detector 18.

It can be seen that if the source 28 emits within the first spectral band and is thus detectable by the detector 18 then the fluorescence time constant of the material 20 can be measured while simultaneously verifying the continuity of the fiber optic cable 12. The power of the returning excitation pulse signal (at the pump wavelength) can also be employed as an amplitude reference in order to compensate for source 28 drift with temperature. Thus, the system of the invention incorporates within a fire detection system a temperature measurement system having an inherent self-testing capability.

As can be appreciated the material 20 should possess certain physical properties in order to confer the greatest benefit. Firstly, the material 20 preferably fluoresces within the upper fire sensor wavelength, such as within the range of approximately 1.8 to 2.1 microns. Secondly, in order to accurately measure the fluorescence wavelength it is preferable to separate out the pump wavelength. In addition, it is preferable to separate out the pump wavelength without adding additional detectors and/or filters. This is accomplished by providing a material 20 which fluoresces within the upper fire sensor wavelength (1.8 to 2.1 microns) for a pump wavelength within the lower fire sensor wavelength band (0.8 to 1.1 microns). Thirdly, the pump wavelength band to which the material 20 is responsive is preferably relatively broad in that the source 28 may drift in wavelength with temperature. Furthermore, the material 20 preferably has a decay time constant duration that presents a readily measurable quantity at a highest measurement temperature of interest.

Examples of materials which meet these criteria and which are suitable for use with the invention include $YAlO_3$, Yttrium Scandium Gallium Garnet (YSGG), Yttrium Scandium Aluminum Garnet (YSAG) in addition to the aforementioned Th:Ho:YAG. The physical dimensions of the material 20 are also of concern in that the larger the thermal mass which the material has the longer will be the response time of the material to an increase in its ambient temperature. By example, one set of suitable dimensions for the material 20, when comprised of Th:Ho:YAG and end pumped, have been found to be approximately 0.25 inch in diameter by approximately 0.25 inch in length.

The aforedescribed presently preferred embodiment of the invention requires processing of the fluorescence signal to extract the temperature related characteristics of the reflected pulses. Several signal processing techniques employing analog and/or digital methods are presently available. These signal processing techniques can be grouped into two general categories including a simultaneous processing technique of both the flame flicker and temperature inputs and a non-simultaneous processing technique which periodically disables the flicker sensing for a short interval to collect temperature characteristics. An example of the simultaneous detection technique using digital signal processing methods will now be described, from which it will become readily apparent that a generalization will permit non-simultaneous processing.

An underlying principle of simultaneous flicker and temperature processing is frequency multiplexing. Flame flicker frequencies are primarily between 1 and 10 Hz while a fluorescent response pulse whose decay time is to be measured contains most of its useful information above 50 Hz. The low noise amplifiers 40*a* and 40*b* can readily pass the frequencies required. The excitation pulse is preferably generated by the same sensor electronics which analyze the flicker signals. The pulse is preferably generated at a pulse rate of at least twice the highest flicker frequency of interest. The excitation pulse is generated in phase coherence with the flicker sampling. The resulting aliasing effect produces extraneous inputs to the flame processor including a constant (DC) offset and also harmonic frequencies of the excitation pulse. These harmonic frequencies however are generally far greater than the 1 to 10 Hz flicker spectrum and are rejected by filters 44. The DC terms are generally ignored by flicker processing components 46*a*, 46*b* and 48 while the pulse components may be readily filtered out for processing by oversampling and averaging with no resulting degradation of fire sensing performance. For example, a flicker signal sampled at 100 times per second may have superimposed on it a synchronized pulse train at the same rate without creating alias components between 1 and 10 Hz.

In order to extract decay time constant information from the extracted response pulse, the pulse is sampled in phase coherence with a train of excitation pulses. This sampling technique permits the averaging of the data from many individual pulses in order to remove the random effects of flame flicker. For example, a pulse rate of 100 per second permits the averaging of several hundred time constant measurements over an interval of a few seconds during which random fluctuations due to flame flicker are averaged out. In that the flame flicker signal content is relatively weak at the frequencies of the fluorescent response pulses and because many response pulse samples are typically averaged, for example 128 or 256, the time constant data can be extracted to any accuracy which is adequate for temperature measurement.

The greater the amount of signal averaging the greater is the accuracy of the temperature measurement. By example, for an average of 256 samples an accuracy of approximately ±20° C. over a 400° C. span can be attained.

The trailing edge of the return pulse is preferably sampled at least three times at appropriately spaced positions along the trailing edge, the samples being taken immediately following the termination of the excitation pulse. In this regard it can be shown that if the shape of the trailing edge decay is known to be exponential in nature, three data points are sufficient to estimate the time constant with an accuracy suitable for temperature measurement in fire sensor applications. The assumption of a purely exponential shape is not essential to the success of the invention as any predictable curve which varies in a known manner with temperature can be employed. The curve parameters may be used for input to a mathematical operation or a look-up table from which the scene temperature is obtained. Corrections for amplifier distortion may also be included at this point, eliminating the need for tight constraints upon performance. For the case of sinusoidal excitation (FIG. 2*b*) the same timing relationships apply, with the response (now always sinusoidal in shape) providing data for phase shift relative to the excitation. This phase shift is processed by a mathematical operation or the look-up table 21*a*.

From the above it may be seen that care must be taken to insure separation between flicker and temperature processing. If flicker and temperature measurement are not to be performed simultaneously, some of these constraints disappear. Pulse data must still be averaged because flame flicker may be present, but response time constants and excitation frequency are no longer restricted to remain well above the flicker region of 1 to 10 Hz in order to avoid crosstalk. Also, flicker signal filtering to remove pulse components is not required if pulses are not present during fire sensing.

It should be noted that in other embodiments of the invention that the long-wavelength band may be within the range of approximately 1.35 to approximately 1.45 microns coupled with an appropriate crystal that fluoresces at that wavelength. For example, an appropriate crystal is part number QW-7 manufactured by Kigre Corporation. Also, it should be noted that the embodiments disclosed thus far have employed silica fiber but that other types of fiber, having different radiation transmission properties, are within the scope of the invention. For example, fluoride glass fiber which transmits in the visible to approximately 5 micron range and chalcogenide glass which transmits within the 2 to 10 micron range may be employed. As such the choice of detector 18, source 28 and fluorescent material 20 is a function of the particular pass band of the fiber among other considerations.

Figure 4:
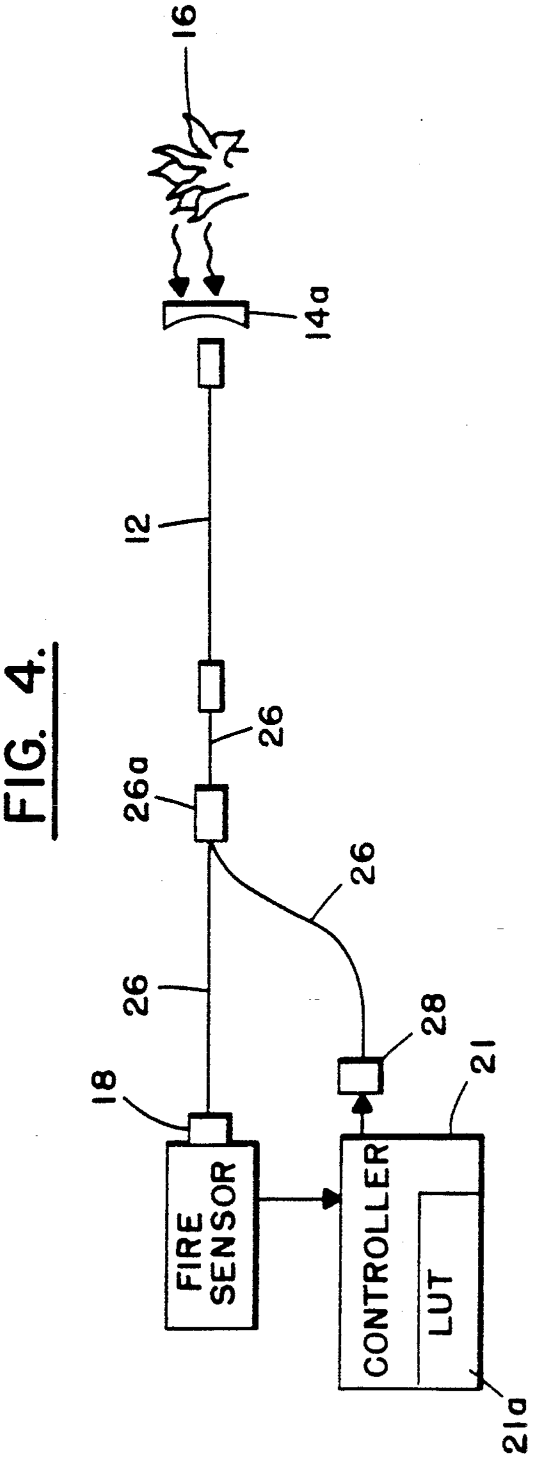
FIG. 4 is a block diagram which illustrates the various optical and electrical components which comprise a fire and overheat sensor which is another embodiment of the invention.

A further embodiment of the invention is shown in FIG. 4 wherein the fluorescent material is selected such that the material is substantially transmissive to the flame wavelengths while being excited to fluoresce within one of the fire sensor wavelength bands. In this embodiment the fluorescent material is serially placed within the optical pat between the fire and the detector 18. If desired, the fluorescent material may function as a portion of the flame signal path. For example, the lens 14*a* may be fabricated from the fluorescent material which thus serves the dual function of coupling the flame emission to the fiber cable 12 and also providing the heat sensor component.

While the invention has been particularly shown and described with respect to a preferred embodiment thereof, it will be understood by those skilled in the art that changes in form and details may be made therein without departing from the scope and spirit of the invention.

What is claimed is:

1. A fire detection system having a fiber optic conductor for conveying radiation at least from a distal end to a proximal end thereof, said system, comprising:

first means, optically coupled to said proximal end of said fiber optic conductor, for detecting within a first and second spectral band the radiation conveyed from said distal end of said fiber optic conductor;

second means, optically coupled to said distal end of said fiber optic conductor, for emitting radiation within at least said second spectral band for conveyance along said fiber optic conductor detection by said first means, said emitted radiation having at least one characteristic which is a function of a temperature of said second means; and third means, optically coupled to said second means through said fiber optic conductor, for generating radiation for inducing said second means to emit the radiation within said second spectral band.

2. A system as set forth in claim 1 wherein said first spectral band is approximately 0.8 microns to approximately 1.1 microns and wherein said second spectral band is approximately 1.8 microns to approximately 2.1 microns.

3. A system as set forth in claim 1 wherein said third means comprises a source of radiation having a periodic output and wherein said second means comprises a body comprised of a fluorescent material.

4. A system as set forth in claim 3 wherein said second means further comprises:

beamsplitter means coupled to said distal end of said fiber optic conductor for directing a portion of the radiation generated by said third means to said body;

lens means interposed between said body and said beamsplitter means; and reflector means positioned for reflecting radiation emitted by said body to said lens means.

5. A system as set forth in claim 3 wherein said body is comprised of $YAlO_3$, YSGG, YSAG or Th:Ho:YAG or combinations thereof.

6. A fire detection system having a fiber optic conductor for conveying radiation at least from a distal end to a proximal end thereof, said system comprising:

detecting means, optically coupled to said proximal end of said fiber optic conductor, for detecting within a first spectral band of approximately 0.8 microns to approximately 1.1 microns and within a second spectral band of approximately 1.8 microns to approximately 2.1 microns the radiation conveyed from said distal end of said fiber optic conductor;

emitting means, optically coupled to said distal end of said fiber optic conductor, for emitting fluorescent radiation having a wavelength or wavelengths within at least said second spectral band for conveyance to said detecting means along said fiber optic conductor, said emitted fluorescent radiation having at least one characteristic which is a function of a temperature of said emitting means; and source means, optically coupled to said emitting means through said fiber optic conductor, for generating radiation having wavelengths substantially within said first spectral band for inducing said emitting means to emit the radiation within said second spectral band.

7. A system as set forth in claim 6 wherein said emitting means further comprises:

beamsplitter means coupled to said distal end of said fiber optic conductor for directing to said emitting means a portion of the radiation generated by said pulsed source means;

collimating lens means interposed between said emitting means and said beamsplitter means; and mirror means positioned for reflecting radiation emitted by said emitting means to said lens means.

8. A system as set forth in claim 6 wherein said emitting means is comprised of $YAlO_3$, YSGG, YSAG or Th:Ho:YAG or combinations thereof.

9. A system as set forth in claim 6 wherein said detecting means comprises:

first radiation detecting means responsive to radiation within said first spectral band and having an output signal coupled to a first signal channel;

second radiation detecting means responsive to radiation within said second spectral band and having an output signal coupled to a second signal channel;

wherein each of said first and said signal channels comprise in combination means responsive to signals having frequencies associated with flame flicker frequencies including amplifier means, variable gain means, bandpass filter means and randomness testing means;

wherein said detecting means further includes cross correlation means having an input from each of the first and the second signal channels and also ratio detecting means having an input from each of said bandpass filter means; and wherein said detecting means further comprises output means having inputs coupled to said first and said second signal channels, said ratio detector means and said cross correlation means and an output responsive thereto for indicating the occurrence of a flame.

10. A system as set forth in claim 6 wherein said emitting means is serially disposed within an optical path between said distal end of said fiber optic conductor and said detecting means.

* * * * *